United States Patent [19]
Berlin et al.

[11] Patent Number: 5,839,722
[45] Date of Patent: Nov. 24, 1998

[54] PAPER HANDLING SYSTEM HAVING EMBEDDED CONTROL STRUCTURES

[75] Inventors: Andrew A. Berlin, San Jose; Patrick C. P. Cheung, Castro Valley; David K. Biegelsen, Portola Valley; Warren B. Jackson, San Francisco; Mark H. Yim, Palo Alto, all of Calif.

[73] Assignee: Xerox Corporation, Stamford, Conn.

[21] Appl. No.: 756,153

[22] Filed: Nov. 26, 1996

[51] Int. Cl.⁶ .................................................. B65H 29/24
[52] U.S. Cl. ...................... 271/265.02; 271/195; 406/19; 406/88
[58] Field of Search .................................. 271/194, 195, 271/265.02, 265.03, 264; 406/86, 87, 88, 10, 19; 414/676

[56] References Cited

U.S. PATENT DOCUMENTS

| | | | |
|---|---|---|---|
| 3,243,181 | 3/1966 | Lyman | 271/195 |
| 3,405,977 | 10/1968 | Albright | 271/195 |
| 3,414,331 | 12/1968 | Fogg | 406/88 |
| 3,422,411 | 1/1969 | Smith, Jr. | 271/195 |
| 3,437,335 | 4/1969 | Gluskin | 271/195 |
| 3,550,964 | 12/1970 | Spyropoulos | 406/19 |
| 3,706,475 | 12/1972 | Yakubowski | 406/88 |
| 3,918,706 | 11/1975 | Craft | 271/195 |
| 4,299,518 | 11/1981 | Whelan | 406/88 |
| 4,493,548 | 1/1985 | Ateya | 355/3 FU |
| 4,577,854 | 3/1986 | Bachmann et al. | 271/227 |
| 4,618,292 | 10/1986 | Judge et al. | 406/19 |
| 4,874,273 | 10/1989 | Tokisue et al. | 406/19 |
| 5,284,179 | 2/1994 | Shikida et al. | 37/334 |
| 5,497,987 | 3/1996 | Henn et al. | 406/88 |
| 5,634,636 | 6/1997 | Jackson et al. | 271/195 |

FOREIGN PATENT DOCUMENTS

| | | | |
|---|---|---|---|
| 214554 | 8/1989 | Japan | 271/227 |
| 243418 | 9/1990 | Japan | 406/19 |
| 2226538 | 7/1990 | United Kingdom | 271/195 |
| 2275903 | 9/1994 | United Kingdom | 406/19 |
| WO 94002396 A1 | 2/1994 | WIPO | 406/88 |

OTHER PUBLICATIONS

Gruber et al., Wafer Chuck Air Flow, IBM Technical Disclosure Bulletin, vol. 18 No. 6, pp. 1865–1866, Nov. 1975.
Konishi, S. et al., A Conveyance System Using Air Flow Based on the Concept of Distributed Micro Motion Systems. Journal of Microelectromechanical Systems, vol. 3, No. 2, Jun. 1994, pp. 54–58.
Konishi, S. et al., System Design for Cooperative Control of Arrayed Microactuators. Proceedings of the IEEE Micro Electro Mechanical Systems 1995, IEEE, Piscataway, NJ, USA 95CH35754, pp. 322–327.
Paivanas, J.A. et al., Air Film System for Handling Semiconductor Wafers. IBM J. Res. Develop., vol. 23, No. 4, Jul. 1979, pp. 361–375.

*Primary Examiner*—H. Grant Skaggs
*Attorney, Agent, or Firm*—Robert A. Burtzlaff

[57] ABSTRACT

A paper handling system for air mediated transport of sheets or pages of paper is disclosed. Microelectromechanical valves and sensors are embedded in a dielectric substrate for tracking and controlling paper transport. These microelectromechanical systems can be batch fabricated using resin impregnated dielectric laminates having photolithographically formed circuitry for electrical connections. Use of high speed sensor and valve control systems permit dynamic adjustments to paper trajectory during paper transport.

4 Claims, 9 Drawing Sheets

PAPER HANDLING SYSTEM HAVING EMBEDDED CONTROL STRUCTURES

FIELD OF THE INVENTION

The present invention relates to a paper handling system for air mediated transport of sheets or pages of paper. More specifically, the present invention relates to construction of a paper handling device having valves and sensors embedded in a dielectric substrate for tracking and controlling paper transport.

BACKGROUND AND SUMMARY OF THE INVENTION

A paper transport device or other material processing system must often precisely control position and velocity of paper or other objects moving through the system. Commonly, material processing systems control object movement by physically engaging the object with a separate object drive mechanism that moves the object at a predetermined velocity along a predetermined path. For example, gear driven ratchets, rollers, hooks, or conveyors are widely employed to move objects as diverse as paper, semiconductors, plastics, or steel by mechanically engaging the objects, and moving the engaged objects along a desired path at a fixed velocity. While commonplace, mechanical or frictional engagement of objects does have a disadvantage of requiring direct physical contact with an object. For certain applications, including processing of high purity or delicate materials, contamination or damage to the object may result from mechanical grasping or contact. This is particularly true for high speed processing systems, which may damage objects simply by engaging them. For example, high speed rollers may damage paper through differential engagement of misaligned paper with the roller, resulting in ripping or tearing of the paper.

Fortunately, mechanical or frictional engagement is only one possible means for moving an object. Object drive mechanisms based on various fluid support techniques have long been employed to move delicate objects without requiring solid mechanical contact. For example, instead of using conventional belts, conveyors or rollers, paper moving through xerographic copier systems can be supported on a laminar air flow, or uplifted and moved by directed air jets. This form of fluid support is particularly advantageous, for example, when sheets of paper carrying unfixed toner images must be moved between a photoconductive drum and a fusing station where the toner image is fixed. With conventional physical rollers, the continuing possibility of dynamic distortions to the toner image, or even slight misalignments resulting in image degradation, must always be considered. Problems with image degradation are particularly acute with color images, which must register multiple overlays created by separate color toner/fuser processing cycles to create the color image.

However, previous attempts to use fluid transport in high speed material processing systems that require accurate positioning have not been very effective. The disadvantages of commonly available fluid transport systems that use air jet mechanisms for support is most apparent when flexible objects such as continuous rolls of paper, sheets of paper, extruded plastics, metallic foils, wires, or optical fibers are transported. In such systems, the flexure modes can result in complex object behavior. Unlike rigid objects, flexible objects are dynamically unstable when supported by air jets, with edge curl, flutter, or other undesirable dynamic movements continuously occurring during support and transport. Such undesirable movements of the flexible object can result in mispositioning, transport failure, or even damaging surface contact between the flexible object and an air jet conveyor.

Accordingly, the present invention provides a fluid transport apparatus and method for moving a flexible object that does not require physical contact. The present invention can effectively work with either continuous or discrete flexible objects moving through a materials processing system. The present invention is a fluid transport system for moving a flexible object that includes a conveyor configured to direct fluid flow against opposite sides of the flexible object. A sensor unit is used to sense motion state of flexible object, where motion state is defined to include position, orientation, curvature, speed, or other desired positional or velocity information. A motion analysis unit is connected to the sensor unit to calculate trajectory of the flexible object during transport based on its sensed motion state. Trajectory calculations can include determination of overall object position, velocity, and orientation information, as well as position, velocity, and orientation of subregions within the object (such as caused by flexure) To ensure for dynamic adjustments necessary for transport of the flexible object, a motion control unit is connected to the motion analysis unit, with the motion control unit configured to modify fluid flow directed against opposite sides of the flexible object to adjust motion state of flexible objects. This permits correction of object misalignments, incorrect speed or travel path, or object pitch, roll, and yaw (if three dimensional orientation information is available), and even unwanted flutter, buckling, or edge curling.

In a most preferred embodiment of the present invention, paper or other graphically markable material is among the flexible objects capable of being tracked in accordance with the present invention. A paper handling system includes a plurality of opposed air jets adjusted for transport of paper, with at least a portion of the plurality of air jets being individually controllable. A sensing array continuously (or intermittently) determines paper position, and an air jet control unit connected to the sensing array is configured to modify paper trajectory in response to information received from the sensing array. In response to the calculated position, the air jet control unit modifies paper movement or orientation (for example, by selectively increasing or decreasing air flow from air jets that impart momentum to defined subregions of the paper) to nearly instantaneously correct for discrepancies in the motion state of the paper, including its position, orientation, trajectory, velocity, flexure, or curvature. In preferred embodiments, the plurality of opposed air jets can be used to apply tensile or compressive forces to flatten paper, and the air jet control unit can be used to maintain paper in this flattened position during transport. Of course, other paper positions (in addition to flat) can also be maintained, with, for example, the plurality of opposed air jets being used to generate sufficient force to curve selected subregions of the paper.

In a most preferred embodiment, the sensors used to detect the paper position and trajectory, and the air jets that transport the paper, are microdevices based on micron and millimeter scale microelectromechanical systems (MEMS) technology widely used in microsensors, microfluidic controls systems, and micromachines. Currently, MEMS sensors are used in automobiles, medical instrumentation, or process control applications, and can provide accurate determinations of pressure, temperature, acceleration, gas concentration, and many other physical or chemical states. Microfluidic controls (which may be linked to MEMS sensors) include microvalves for handling gases or liquids, flow gauges, and ink jet nozzles, while micromachines include microactuators, movable micromirror systems, or tactile moving assemblies. In part because of the ease of associating and integrating electronic control circuitry (using VLSI techniques), microdevices are commonly constructed from semiconductor material substrates such as crystalline silicon, commercially available in the form of semiconductor wafers used for production of integrated circuits.

Unfortunately, such wafer type substrates are limited in size, generally having a circular diameter of only about 10 to 20 centimeters. Since many potential applications of MEMS require arrays of microdevices distributed on a meter scale, significant costs are associated with construction, distribution, attachment, and interconnection of large microdevice arrays based on silicon substrates. This is of particular concern in connection with large scale control of fluid flow using valve arrays such as would be expected in meter scale control arrays for paper transport. Such large scale fluid valve arrays are useful for numerous applications, including distributed actuator controls, paper or object positioning, dynamic control of fluid instabilities, construction of fluid actuated tactile displays, or microcontrol of microchemical reactions and biological assays. However, correctly positioning, mounting, and supplying power and control address lines to tens of thousands of fluid valves in meter scale arrays is expensive and unreliable. What is needed is a low cost and reliable microdevice construction method and system for supporting and controlling microdevice sensors, microdevice controllers, and microdevice micromachines.

The present invention provides a practical alternative to the use of silicon wafer substrates for microdevice construction and support in paper handling systems. A microdevice suitable for a paper handling system in accordance with the present invention can be constructed at least in part from a dielectric material forming a laminate, and is typically embedded within multiple laminate layers. The dielectric can be a fibrous, woven, extruded, or deposited polymer; a ceramic, or other dielectric material capable of being economically formed in meter scale sections. In a preferred embodiment, the laminate layer includes a dielectric base material and an impregnated bonding resin such as is commonly employed in conventional printed circuit board construction. The microdevice can be embedded in the laminate, and connected to at least one metallic electrical connection photolithographically formed on the laminate, with electrical connections allowing the device to be electrically powered and controlled. In certain embodiments, electroplated metals such as copper are bonded to form a part of the laminate that can be etched or otherwise modified to produce movable components. Such construction allows, for example, microdevice sensors or valves having flap valves, movable cantilever systems, or diaphragms. Advantageously, conventional etch techniques and materials developed for printed circuit board production can be modified for construction of novel microdevices according to the present invention. When dimensional stability or accurate spacing of large arrays of microdevices is important, the laminate can be rigidly constructed from woven glass and high bonding strength resins such as epoxies or polyimides. Conversely, if flexibility or smooth curves are needed in a particular application (e.g. an array of microvalved air jets for supporting objects moved in a tightly curved pathway), a flexible laminate constructed in part from polyimide, polyethylene terephthalate, aramid, or polyester dielectric films, and flexible polyester resins may be suitable.

Advantageously, the present invention allows for low cost batch construction of large scale arrays of microdevices for controlling paper transport, with meter scale constructions having hundreds of thousands of embedded microdevices being contemplated. The microdevices can be interconnected, or individually connected to power and control lines by photolithographically defined and etched leads. Typically, conventional printed circuit board construction techniques are used, with electrodeposited copper, adhesively attached and patterned as part of a photochemical etch process providing electrical connections for powering, controlling, or receiving sensed information from the microdevices. As will be appreciated, when extensive electrical connections are required, multilayer photolithographically etched boards can beneficially be used. In addition, movable or partially unsupported components can be defined by sacrificial etching techniques or other suitable MEMS batch processing techniques for undercutting or three dimensional shaping of components. Use of such sacrificial etching techniques in conjunction with printed circuit board laminates advantageously allows low cost construction of micron to millimeter scale valves, sensors, and conduit systems.

A particularly preferred embodiment of the present invention provides for microvalves embedded or attached immediately adjacent to conduits, passageways, or apertures defined in or supported by the laminate. The conduits allow fluid flow, while the microdevices embedded in the laminate intersect the conduits to provide either a valving or sensing mechanism for interacting with the fluid flow. Large scale arrays of microdevices for controlling fluid flow can be easily connected to centralized or distributed controllers by the photolithographically formed metallic electrical connections. In conjunction with appropriate sensors and fluid pressure sources, these arrays can be used to precisely control fluid flow, support objects such as paper, or even inject electrical charge, dyes, inks, or chemicals.

Additional functions, objects, advantages, and features of the present invention will become apparent from consideration of the following description and drawings of preferred embodiments.

DETAILED DESCRIPTION OF THE DRAWINGS

Figure 1:
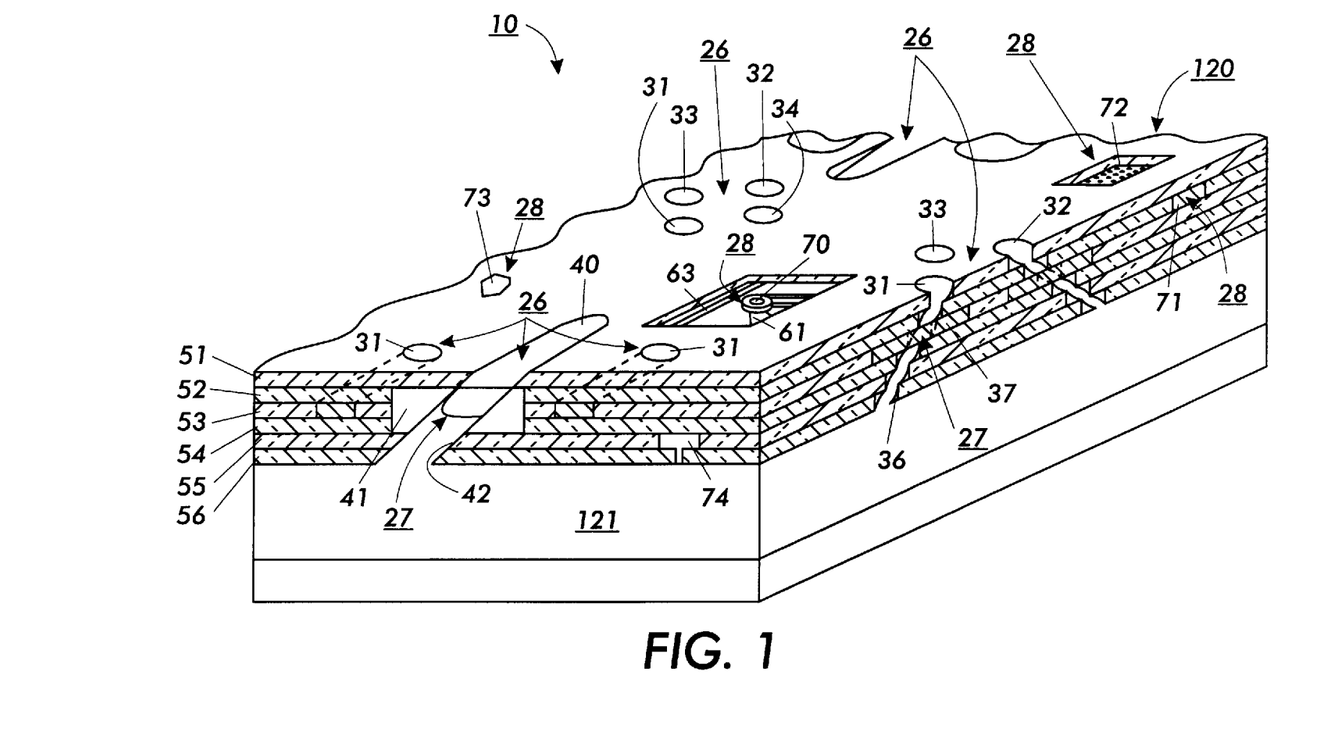
FIG. 1 is a portion of a conveyor for moving paper, illustrating exemplary air jet structures and microdevice sensors.
Figure 2:
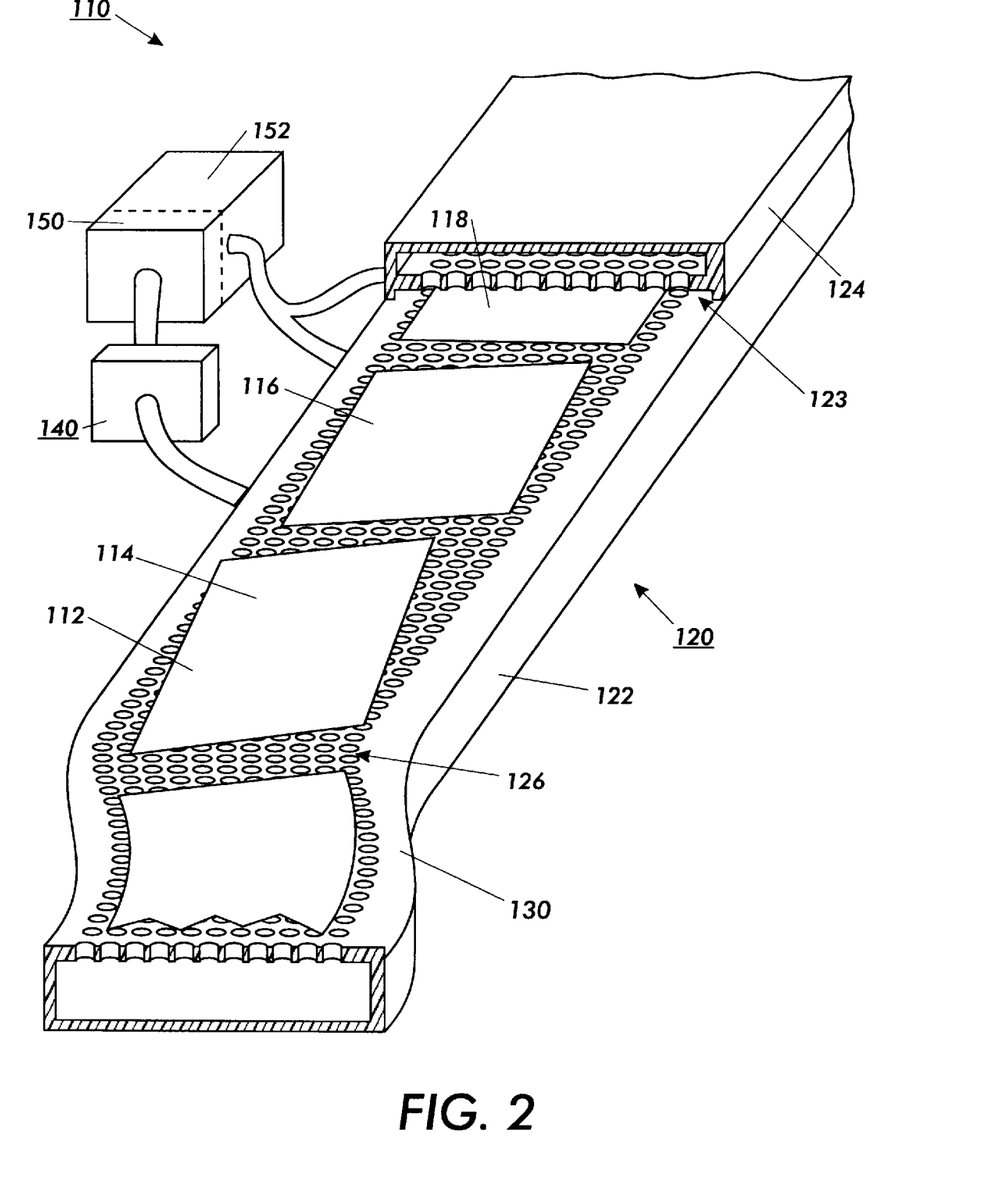
FIG. 2 is a partial view of a paper handling system having a conveyor with air jets and microdevice sensors such as illustrated with respect to FIG. 1.

A portion of microdevice support system 10 for an object conveyor 120 having embedded microdevices is illustrated in FIGS. 1 and 2. Microdevices can include or incorporate air flow conduits, microdevice sensors such as thermal motion, vibration, optical, acoustic, or other detectors, and microfluidic controllers such as valves suitable for air flow control. Objects suitable for transport in conveyor 120 may include paper, plastics, semiconductor wafers, ceramics, metals, wood, or any other conventional material or articles of manufacture. Note that the description of the present invention in conjunction with the object conveyer 120 is for illustrative purposes only, and in suitable circumstances the present invention allows the microdevice support system 10 to support sensors or microdevice actuators for detecting, tracking, manipulation or control of a wide variety of objects and processes, including those associated with fluid control, optical sensing, thermal sensing or tagging, or even electrostatic, xerographic, laser or ink jet printing processes. Also, as will be appreciated, the conveyor 120 does not have to be air operated, but can be replaced in part by belts, friction drives, slides, chutes, mechanical grippers, vacuum attachment mechanisms, or any other conventional conveyor or drive mechanism positioned adjacent to, for example, a microdevice sensor embedded in the microdevice support system 10.

As seen in FIGS. 1 and 2, the microdevice support system 10 can include numerous microdevices, including arrays of air conduits 26, valves 27, and sensors 28, all attached, embedded, or actually formed in whole or in part from laminates of resin impregnated dielectric board having metallic electrical connections photolithographically formed and etched on the laminate using conventional printed circuit techniques. The air conduits 26 can include, but are not limited to, open or closed chambers, apertures, receptacles, or other suitable cavity for permitting fluid flow therethrough, as well as accommodating sensors or microactuators.

In FIG. 1, the conveyor includes six bonded laminates 50–56 formed from woven glass impregnated with an epoxy or other polymeric binding agent to provide a rigid, dimensionally stable dielectric support for air conduits 26, microactuators such as valves 27, and sensors 28. As will be appreciated, suitable laminates can be formed from combinations of base dielectric materials and widely available polymeric resin agents. For example, dielectric materials such as paper, paper-glass composites, glass mattes or frits, aramids, polyethylene, or woven glasses can be used as a base material, alone or in conjunction with fillers such as ceramic microspheres, clay powders, or other dielectric-, hygroscopic-, or flexibility-modifying agents. These base materials can be combined with phenolic resins, epoxies, polyesters, thermoplastic materials such as polytetrafluoroethylene or polysulfones, or polyimides, with the particular selected combination dependent on cost constraints, desired dimensional, dielectric, fungicidal, and thermal characteristics, and other factors known to those skilled in the art of printed circuit board construction. By suitable combinations of materials, construction of laminates having particular combinations of properties can be formed. For example, if accurate spacing of large arrays of microdevices is important, the laminate can be constructed to FR-4 or FR-5 standards from woven glass and a high bonding strength, self-extinguishing epoxy. Conversely, if flexibility or smooth curves are needed in a particular application (e.g. an array of microvalved air jets for supporting objects moved in a tightly curved pathway), a flexible laminate constructed in part from polyimide, polyethylene terephthalate, aramid, or polyester dielectric films, and flexible polyester resins may be used.

In addition to constructing laminates using conventional printed circuit board composites, alternative dielectric laminate structures that augment or replace, in whole or in part, woven glass/resin impregnated laminates can be used. For example, for certain applications the use of plastic films, metals, glasses, ceramics, injection molded plastics, elastomeric layers, ferromagnetic layers, sacrificial photoresist layers, shape memory metal layers, optical guiding layers, polymer based light displays or light generators, or other suitable material are contemplated. These can be adhesively bound to a resin impregnated dielectric board, or form a laminate composite having embedded microdevices themselves. As will be appreciated, adhesive bonding is not required to form laminates supporting devices, with alternative layer application or construction techniques such as multiple overcoatings being possible.

As will be appreciated, various layer fabrication techniques can be employed for definition of the laminate or microdevice structures in accordance with the present invention. For example, microdevice sensors or actuators can be created through surface etching of microdevice structural components on two or more laminate strips, followed by sandwiching the strips to form a working microdevice embedded in the laminate layers. Alternatively, in certain preferred embodiments the use of sacrificial layers during laminate construction is contemplated. After layering additional laminate layers on top of the sacrificial layer (typically photoresist, an easily erodable plastic, or a chemically etchable material), the sacrificial layer can be partially or completely removed to leave freestanding, suspended or movable extended microactuation structures such cantilever beams, movable flaps, louvers, and diaphragms (which can be considered equivalent to a cantilever beam pinned at all edges). In still other layering techniques, selective or patterned deposition can be used to partially or completely construct laminate layers. Alternatively, chambers or receptacles for holding microdevices or microdevice components can be created by the sandwiching or sacrifice techniques as previously described, drilling, punching, mold forming, or any other conventional technique known to those skilled in the art. Microdevices can then be formed, deposited, emplaced or otherwise embedded in the laminate defined chamber.

Figure 3:
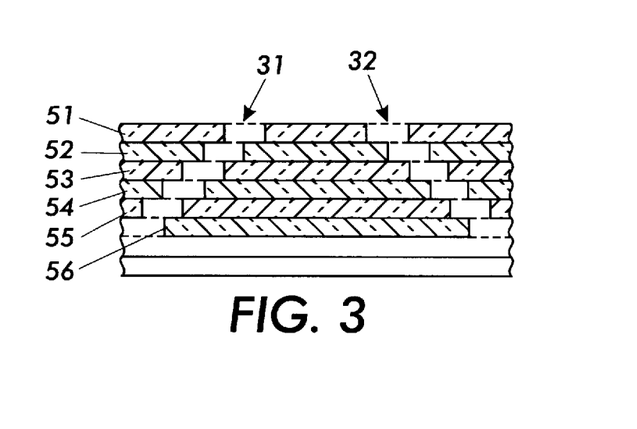
FIG. 3 is a view illustrating construction of angled air jets using stepped drill structures in a laminate.
Figure 4:
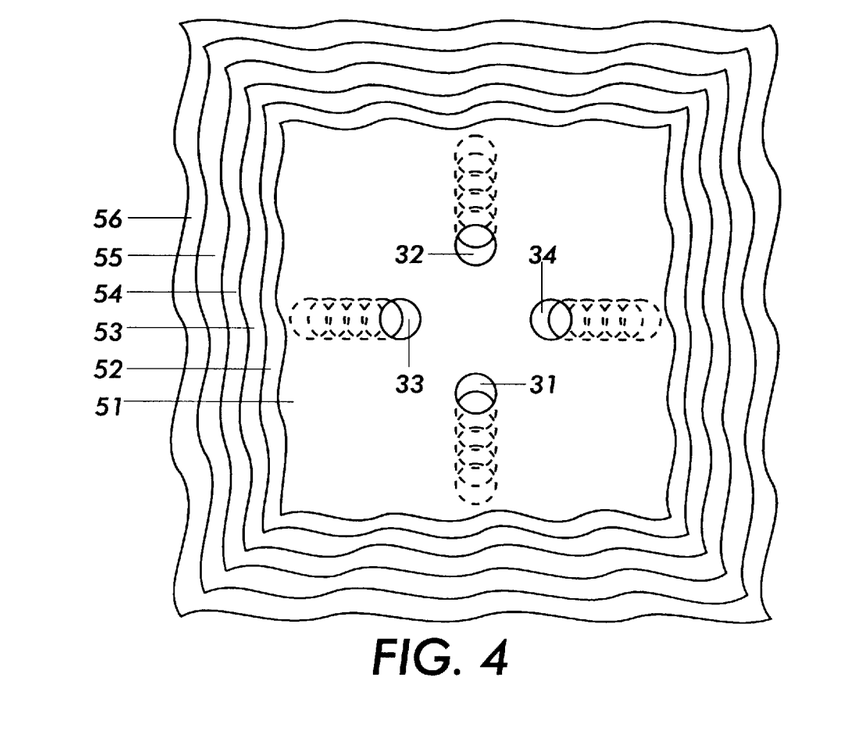
FIG. 4 is a top view of the angled air jets of FIG. 3.
Figure 5:
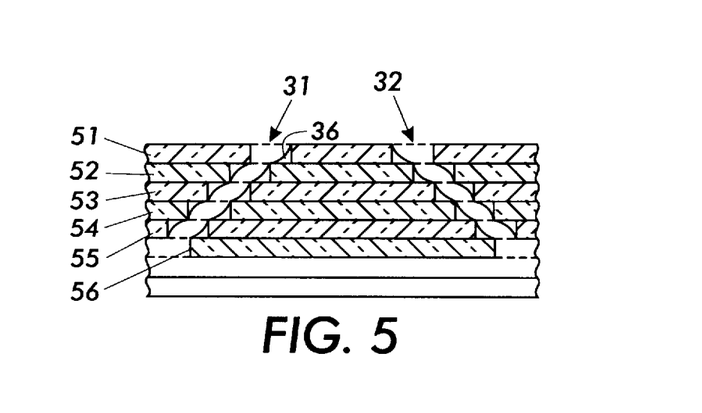
FIG. 5 is a view of the air jets of FIGS. 3 and 4 with the stepped edges smoothed.

Depending on the particular laminate construction technique employed, air conduits 26 can be directly drilled, punched, mold formed from plastic to provide a separate laminate layer, or even mold formed and later embedded in a drilled out section of a laminate layer. Conduits can have circular, triangular, elliptical, rectangular, or square cross sections (with non-circular cross section conduits generally being punched or mold formed). For example, as seen with respect to FIGS. 1 and FIGS. 3–5, air conduits 26 can include angled air conduits 31, 32, 33, and 34 having a roughly circular cross section formed by offset drilling through successive laminate layers. This is best seen in FIGS. 3 and 4, which respectively illustrate a side and a top view of oppositely directed angled air conduits 31 and 32. The drilled holes are indicated in shadow in FIG. 4 to better indicate overlapping orientation of the drilled holes. As can be seen, each laminate layer 51–56 has perpendicular holes drilled therethrough, with the drilled holes being slightly offset from layer to layer in a longitudinal direction to produce a conduit in the laminate stack angled at about 45 degrees with respect to the perpendicular direction of the laminate. Sharp edges in the conduit can be smoothed by post lamination processing, with a suitable polymer or epoxy 36 being coated in the conduit through dipping, spin coating, injection, or other suitable process. Of course, other techniques for smoothing edges can also be used, including those based on chemical or mechanical abrasion, or even thermally based techniques for inducing plastic reflow. As will be appreciated, modifications of this technique can allow production of conduits angled from perpendicular (eg. 90 degree angled conduits) to nearly horizontal (5 degree angled conduits), with the 45 degree angled conduit shown in FIG. 1 being typical. By offsetting drilled holes in both a lateral and longitudinal direction for successive laminations, it is even possible to construct complex curved or spiraled conduit structures. Use of multiple lateral and longitudinal drill patterns will also allow construction of complex manifolds, with a common inlet branching to multiple outlets, or multiple inlets being combined into a common outlet as desired. Diameter of the conduits can be varied from 10 microns to centimeter scale, with millimeter scale apertures being typical, depending on the particular application.

Figure 6:
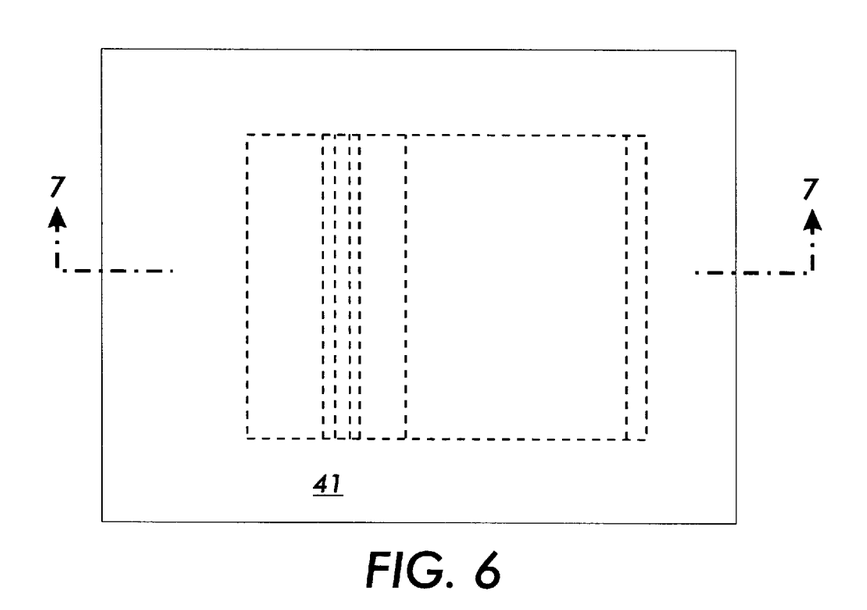
FIG. 6 is a top view of a molded air jet channel unit such as indicated in FIG. 1.
Figure 7:
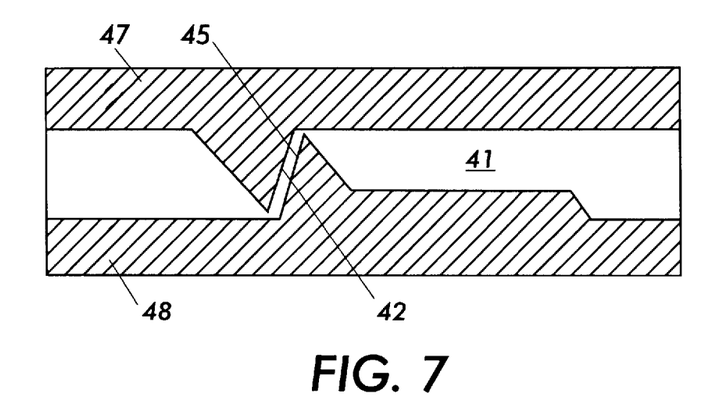
FIG. 7 is a side view of the molded air jet channel unit of FIG. 6, with upper and lower molds used to produce such a channel unit also being illustrated.

Alternatively, air conduits 26 can include a mold formed plastic conduit 40, having an angled air channel 42 defined by a molded body 41. The conduit is embedded in the six bonded laminates 50–56 by drilling out appropriate sections of each layer and inserting the molded body 41. Construction of conduit 40 is best seen with reference to FIGS. 6 and 7, which respectively illustrate a top view and a cross sectional view of a mold for constructing an angled conduit. As can best be seen with reference to FIG. 7, a top mold 47 is brought into contact with a bottom mold 48. Each mold 47 and 48 respectively have an angled projection 42 and 45 that extend at a predefined angle matching the desired conduit angle. Faces of each projection 42 and 45 are mated (with the faces meeting at a slight angle from the perpendicular to reduce problems associated with dimensional tolerances in case of slippage or other slight mismatch), and plastic is injection molded around the projections to form body 41 and air channel 42. As will be appreciated, arrays of angled channels can be manufactured using this technique, with arrays of opposing angled channels (such as illustrated with respect to the drilled out conduits 31–34) being possible. As will be appreciated, large arrays can even form separate laminate layers or portions of laminate layers, as well as being individually embedded or mounted in the laminate.

As seen in FIG. 1, valves 27 can be positioned in air conduits 26 to positively control fluid flow (including both gaseous and aqueous fluid flow, as well as solids entrained in gases or liquids) from a fluid pressure source 121 through the conduits 26 to exert force on a transported object. The fluid pressure source 121 (typically filtered air) can be provided by a fan, pressurized air source, or any other conventional device suitable for modifying available fluid pressure. Valves may include an electrostatically controlled flap valve 37 positioned in conduit 31, or an electromagnetic valve 43 embedded in channel 42 of valve 40. Printed copper control lines 63 electrically connected to the valves 27 can be used to provide electrical signals that open or close the valves. In addition to electrostatic or electromagnetic valves, other conventional valves known to those skilled in the art may be used, including but not limited to flap valves, movable membrane valves, slide valves, hinge or butterfly valves, piezoelectric, electrorheological, thermoexpansive, or shape memory alloy valves, bimorph based thermal valves, rotary, or even simple pressure actuated spring valves.

As will be appreciated, microactuators such as valves 27 can be constructed with a variety of machining or micromachining techniques, including those associated with conventional integrated circuit or printed circuit board fabrication. For example, chemical etching, electron beam lithography, photolithography, laser ablation, or other standard integrated circuit processing technologies can be used to define necessary valve apertures. Alternatively, injection molding, high precision numerically controlled machines, or stereolithography can be employed for valve construction. Materials used in construction may include plastics, metals, glasses, or ceramics. In one possible embodiment, plastics, epoxies, glass, silicon, polysilicon, silicon nitride, silicon oxide, oxynitride, plastics or metals such as electroplated copper or aluminum, or any other available material suitable for lithographic processing can be used to define the necessary microactuator, valve, valve housing, valve structures, or conduits. Electrodes can be any conductive metal or polymer, while movable components can be constructed from electroplated copper, plastic films, aluminum coated mylar, plated nickel, or polyimide sandwiched aluminum. Large arrays of the microactuators having one or more movable components can be constructed, with meter scale arrays having tens or even hundreds of thousands of individual microactuators distributed throughout a dielectric substrate in accordance with the present invention being contemplated.

Sensors 28 are used to provide information, or for directly or indirectly controlling microactuators such as valves 27. Sensors 28 can include, but are not limited to, commercially available vibration sensors 71, thermal sensors 72, capacitive sensors 73, pressure sensors 74, optical sensors 70, or any other conventional sensor system that can be embedded within, constructed in part from, or attached to the laminates 50–56. Typically, the sensors 28 are completely embedded in predefined chambers or receptacles, with a conduit or other access port defined in the laminate to allow sensing outside the laminate. Such sensors are used, for example, to track moving objects by changes in detected thermal, optical, or electrical properties, or in the case of the vibration sensors 71, to monitor system vibration frequencies and report any abnormalities (note that vibration sensors can be completely embedded in a laminate chamber, with no aperture or external access other than supplied electrical connections being required). Whether used for object detection or system monitoring, sensors 28 can be connected to valves 27 by copper control lines 61 to provide local valve control, or alternatively, can be connected to central sensor signal processing unit for analysis.

Use of the microdevice support system with its associated valve and sensor arrays as part of a paper handling system 110 is illustrated with reference to FIG. 2. As seen in FIG. 2, valve and sensor arrays as taught with respect to FIG. 1 can be used for moving objects, including flexible objects such as paper. Such a paper handling system 110 can be optimized for handling sheets of paper 112 without requiring direct physical contact by rollers, belts, or other mechanical transport devices. The paper handling system 110 has a conveyor 120, divided into a lower section 122 and a upper section 124. For clarity, the upper section 124 is cut away to better illustrate paper movement, however, it will be appreciated that the upper section 124 and lower section 122 are substantially coextensive. The sections 122 and 124 are maintained in spaced apart relationship to define a passage 123 therebetween, with the passage sized to accommodate non-contacting passage therethrough of paper 112. Each section 122 and 124 has a plurality of independently or semi-independently controlled adjustable air jets 126 (such as may be provided in conjunction with conduits 26 of FIG. 1) for dynamically supporting, moving, and guiding paper 112 through the system 110. The intensity or directionality of air jets 126 can be controlled by microdevice valves in conduits 126, or even by use of alternative microdevices for directing air flow, such as directional vanes, louvers, or other mechanical air flow redirectors that can be embedded within or adjacent to conduits 26.

The conveyor 120 is constructed from multiple laminate layers with embedded microelectromechanical controllers and sensors as discussed in connection with FIG. 1. As will be appreciated, using opposed and precisely controllable air jets in sections 122 and 124 having multiple angled orientations, such as illustrated with respect to conduits 31–34, is one mechanism for advantageously permitting adjustable application of air flow to opposing sides of paper 112, dynamically holding the paper between sections 122 and 124, while allowing precise control of paper position, velocity, and orientation through application of vertical, lateral, or longitudinal forces (again by directed air jets). As an added advantage, the use of independent or semi-independent controlled adjustable air jets allows for dynamically increasing or decreasing air flow directed against portions of paper 112, allowing straightening, flattening, curling, decurling, or other desired modification in paper topography, as well as adjustments to paper position, orientation and velocity. In addition, paper of various weights, sizes, and mechanical characteristics can be easily supported and accelerated by appropriate modification of the air flow applied by air jets 126. For example, a heavy, thick, and relatively inflexible cardboard type paper may require more air flow from the jets 126 for support and maneuvering, while a lightweight paper sheet may require less overall air flow, but may need quicker and more frequent air flow adjustments directed by the independent or semi-independent air jets 126 to compensate for flutter or edge curling effects. Advantageously, the use of large numbers of independent valve controlled air jets allows diverse paper types and sizes to simultaneously be transported, with appropriate modifications to air flow characteristics being made for each paper in the conveyor 120.

Active flexible object guidance (of paper 112) to correct for flutter and other dynamic problems of flexible objects is enabled by provision of a sensing unit 140 that is connected to the plurality of sensors embedded in the conveyor 120. The sensing unit 140 senses the motion state of paper 112 by integrating information received from the embedded sensors, giving spatial and dynamic information to a motion analysis unit 150 capable of calculating relative or absolute movement of paper 112 from the received sensory information, with movement calculations generally providing overall position, orientation, velocity of paper 112, as well as position, orientation, and velocity of subregions of the paper 112 (due to flexure of the paper 112). Typically, the motion analysis unit 150 is a general purpose computer, embedded microprocessor, digital signal processor, or dedicated hardware system capable of high speed image processing calculations necessary for determining object movement. Using this calculated movement information, a motion control unit 152 connected to the motion analysis unit 150 sends control signals to conveyor 120 to appropriately modify movement of paper 112 by selectively increasing or decreasing application of directed air jets to subregions of the paper 112 to reduce flutter, buckling, curling, or other undesired deviations from the desired motion state. As will be appreciated, use of discrete sensors, motion analysis units, and motion control units is not required, with integrated motion analysis and motion control assemblies being contemplated. In fact, it is even possible to provide a plurality of integrated sensors, motion analysis units, and motion control units as integrated microcontroller assemblies on the conveyor, with each air jet being locally or semi-locally controlled in response to locally sensed information.

Whether the sensing unit 140 is discrete or integrated with microcontrollers, in order to ascertain object position properly the sensing unit 140 must be reliable and accurate, ideally having two dimensional spatial and temporal resolution sufficient for overall tracking of the paper through the paper transport path with submillimeter precision, and three dimensional tracking ability for even small areas of the flexible object (typically at less than about one square centimeter, although lesser resolution is of course possible). Further, in many processes the object is moving quickly, allowing less than about 1 to 100 milliseconds for tracking measurements. Fortunately, optical sensors, video imaging systems, infrared or optical edge detectors, or certain other conventional detectors are capable of providing suitable spatial and temporal resolutions. For best results, two dimensional optical sensors (such as charge coupled devices (CCD's)), or position sensitive detectors are utilized. However, suitably arranged one dimensional sensor arrays can also be used. As will also be appreciated in connection with the description of the invention with respect to FIG. 1, sensors other than optical sensors may be used, including but not limited to pressure sensors, thermal sensors, acoustic sensors, or electrostatic sensors.

In operation, use of a sensing unit 140 for feedback control of object movement allows for precise micromanipulation of object motion state. For an illustrative example, in FIG. 2 paper 112 is sequentially illustrated in four distinct positions along conveyor 120, respectively labeled as paper position 108, paper position 114, paper position 116, and paper position 118. In initial position 108, the paper 112 moves along a curving path defined by a flexible portion 130 of the conveyor, constructed at least in part from a flexible polyimide laminate. In position 114, the paper 112 becomes slightly misaligned. As paper 112 is moved along conveyor 120 toward position 116 by air jets 126, the embedded sensors provide information that allows sensor unit 140 to calculate a time series of discrete spatial measurements that correspond to the instantaneous position of paper 112. These elements of a time series of spatial measurement information are continuously passed to the motion analysis unit 150. The motion analysis unit 150 uses the received information (i.e. the sensor measured one, two, or three dimensional spatial information) to accurately determine motion state of paper 112, including its position, velocity, and internal paper dynamics (e.g. trajectory of areas of the paper undergoing curl or flutter). This information (which may be collectively termed "trajectory") is passed to the motion control unit 152, which computes a new desired trajectory and/or corrective response to minimize deviation from the desired trajectory. The motion control unit 152 sends signals to selected air jets 126 to correct the misalignment, bringing the paper 112 closer to a correct alignment as indicated by position 116. This feedback control process for properly orienting paper 112 by feedback controlled corrections to paper trajectory (the paper 112 now spatially located at position 116) is repeated, with the trajectory of paper 112 finally being correctly aligned as shown at position 118. As will be appreciated, this feedback control process for modifying the trajectory of flexible objects can be quickly repeated, with millisecond cycle times feasible if fast sensor, motion processing, and air jet systems are employed.

Advantageously, the present invention allows for manipulation and control of a wide variety of objects and processes. In addition to paper handling, other rigid solids such as semiconductor wafers, or flexible articles of manufacture, including extruded plastics, metallic foils, wires, fabrics, or even optical fibers can be moved in accurate three dimensional alignment. As will be appreciated, modifications in layout of conveyor 120 are contemplated, including but not limited to use of curved conveyors (with curvature either in a process direction or perpendicular to the process direction to allow for vertical or horizontal "switchbacks" or turns), use of cylindrical or other non-linear conveyors, or even use of segmented conveyors separated by regions that do not support air jets. In addition, it may be possible to construct the conveyer 120 from flexible materials, from modular components, or as interlocking segmented portions to allow for quick and convenient layout of the conveyor in a desired materials processing path.

The present invention permits ready detection and correction of trajectory, rotations, slight misalignments, three dimensional misalignments due to flutter, creases, turned paper edges, or other orientation problems that can be difficult to quickly detect and provide suitable movement compensation using standard material processing movement control systems. As will be appreciated by those skilled in the art, proper air jet construction and control is a critical aspect of the present invention. Typically, air jets must be constructed and positioned with respect to a flexible object to enable application of on the order of one millinewton of force to each side of the flexible object, with precise force values of course depending on material and dynamic properties of the flexible object, along with the desired object acceleration and trajectory. For best operation, the exerted air jet forces must be quickly changeable. For example, a typical 0.025 cm diameter orifice having a length of about 0.1 centimeter would be expected to have an intrinsic response time for air movement on the order of 100 microseconds. Of course air conduits, valve response times, controllers, motion analysis, and pressure conditions must also be designed to interact so that air jet operation and control occurs in concert on a millisecond time scale.

Figure 8:
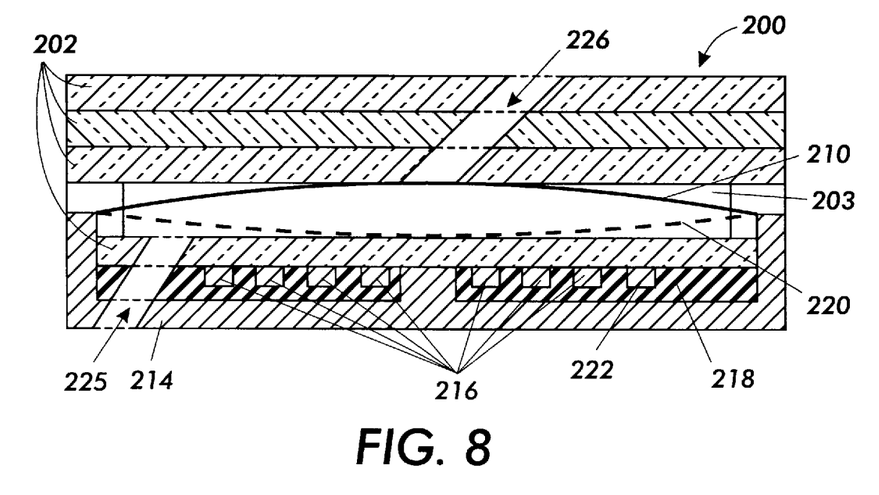
FIGS. 8 and 9 are respectively side and top views of an electromagnetic valve having a single coil for controlling valve closure.
Figure 9:
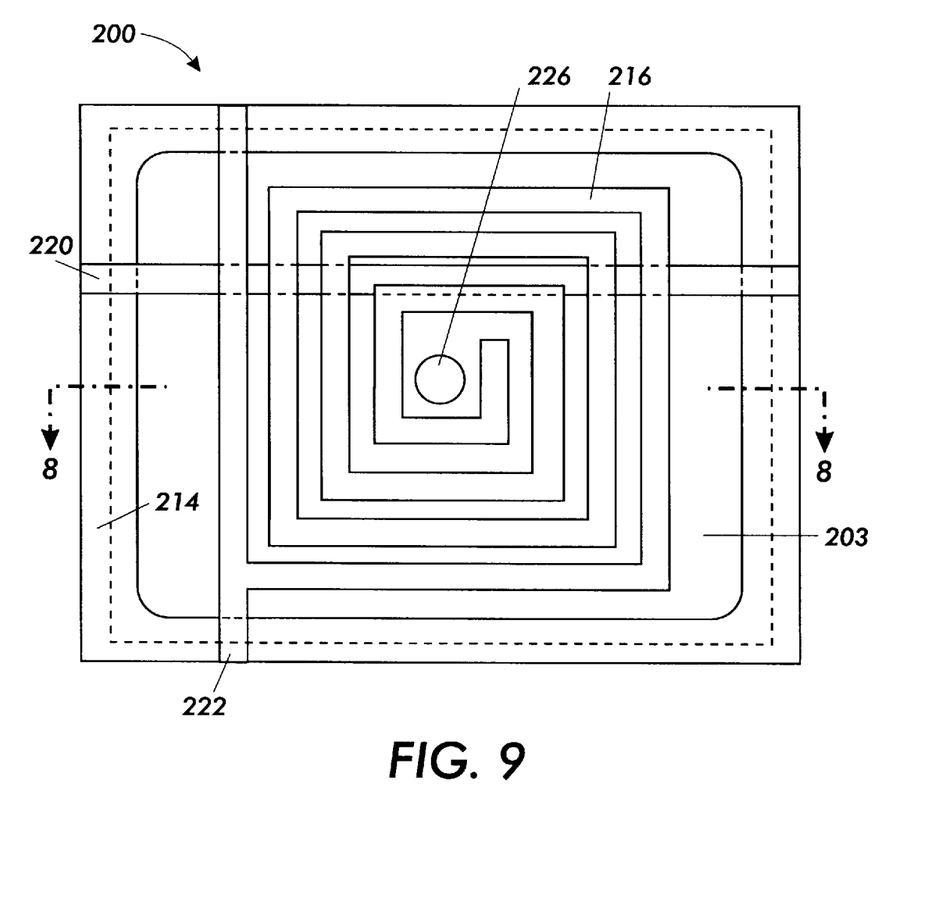

To precisely control air flow through previously discussed conduits 26 of air jets 126, electromagnetic valves constructed in part using conventional printed batch processing techniques are particularly suitable. For example, FIGS. 8 and 9 illustrate an actively addressable electromagnetic valve 200 constructed in part from movable components and structures formed on laminates 202 according to the present invention. The laminates 202 are drilled, etched, mold formed or otherwise modified to define a chamber 203 having an inlet conduit 225 for inward air flow and an outlet conduit 226 for outward air flow as an angled air jet. A compressively stressed membrane 210 constructed from substantially uniform permalloy or other magnetically susceptible material is positioned in the chamber 203. The membrane 210 is stressed to normally close the valve 200 by blocking outlet conduit 226. To open the valve 200 requires electrically addressing (with row address line 220 and column address line 222) a copper planar coil 216 formed on a dielectric layer 218 of the laminate 202. In conjunction with a permalloy layer 214, this creates sufficient electromagnetic force to pull the membrane to position 212, opening the valve and allowing pressurized air in the chamber 203 to escape through outlet conduit 226. When the current is reduced, the mechanically biased membrane 210 springs back into blocking position, closing the valve.

Figure 10:
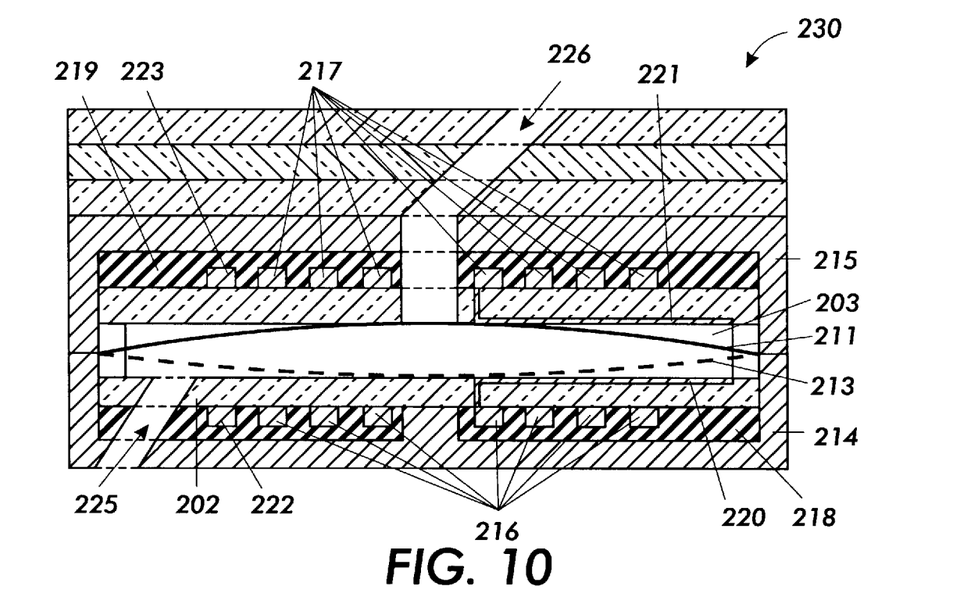
FIG. 10 is a side view of an electromagnetic valve having dual coils mounted to oppose each other.

FIG. 10 shows an alternative embodiment of an electromagnetic valve 230 that relies on an imposed mechanical bistability for a membrane 211 to permit passive matrix addressing. In contrast to the membrane 210 of FIG. 8, biased to be normally closed, the membrane 211 is bistable, being stable both in a closed position indicated by solid lines, and in an opened position indicated by dotted lines 213. Valve 230 is very similar to valve 200 of FIGS. 8 and 9, differing only the addition of a secondary copper planar coil 217 (with row and column address lines 221 and 223) formed on a dielectric layer 219 of the laminate 202, along with a secondary permalloy layer 215. In operation, electrically addressing the copper planar coil 216 creates sufficient electromagnetic force to pull the membrane to position 213, opening the valve and allowing pressurized air in the chamber 203 to escape through outlet conduit 226. When the voltage is reduced, the mechanically biased membrane 211 is left in one of its two mechanically stable positions, so it remains in that open position. To close the valve 230, the row and column address lines 221 and 223 can be transiently electrically addressed, resulting in sufficient electromagnetic force to pull the membrane to its original blocking position, closing the valve and preventing pressurized air in the chamber 203 from escaping through outlet conduit 226.

Figure 11:
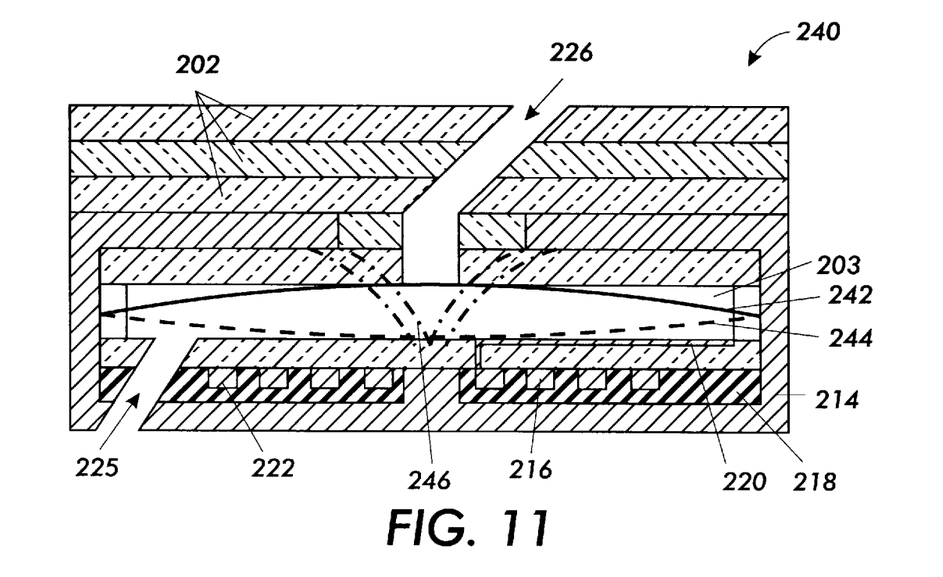
FIG. 11 is a side view of an alternative embodiment of an electromagnetic valve having a single coil.

Yet another bistable valve embodiment of an electromagnetic valve 240 is illustrated in FIG. 11. In this embodiment, a bistable membrane 242 is stable both in a closed position indicated by solid lines, and in an opened position indicated by dotted lines 244. Valve 240 is very similar to valve 200 of FIGS. 8-9, with membrane 242 differing from the uniform permalloy membranes 210 and 211 by use of permalloy patterning to create a poled magnetic layer and magnetic field line patterns indicated by lines 246. In operation, voltage addressing of the copper planar coil 216 causes current flow in the coils 216 to create sufficient electromagnetic force to pull the membrane to position 213, opening the valve and allowing pressurized air in the chamber 203 to escape through outlet conduit 226. When the current is reduced, the mechanically biased membrane 242 is left in one of its two mechanically stable positions, so it remains in that open position. To close the valve 230, the row and column address lines 221 and 223 can be transiently electrically addressed to reverse current direction, resulting in sufficient electromagnetic force to push the magnetically poled membrane to its original blocking position, closing the valve and preventing pressurized air in the chamber 203 from escaping through outlet conduit 226.

Figure 12:
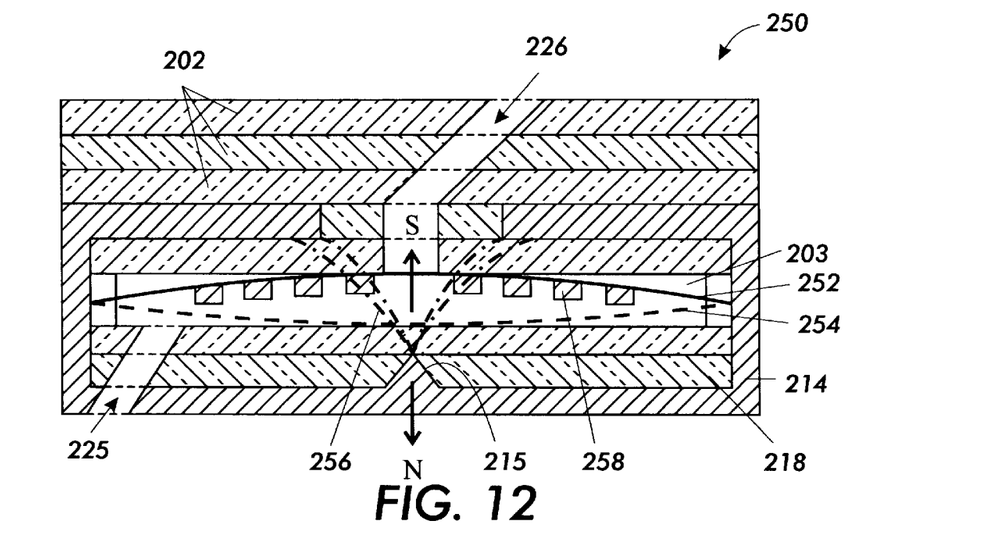
FIG. 12 is a side view of an alternative embodiment of an electromagnetic valve having a single coil mounted on a bistable membrane.

Still another suitable single coiled electromagnetic valve 250 is seen with respect to FIG. 12. As in valve 240 of FIG. 11, valve 250 has a bistable membrane 252 stable both in a closed position indicated by solid lines, and in an opened position indicated by dotted lines 254. Like valve 240, valve 250 only requires a single coil for bistable operation, with reversal of current direction in the coil causing the membrane to move back and forth between the open and closed position. However, in contrast to valve 240, the membrane 252 of valve 250 supports a planar coil 258 rather than the planar copper coil being supported by dielectric layer 218 as in valve 240. In operation, electrically addressing the copper planar coil 258 causes current flow in the coils 258 to create sufficient electromagnetic force to pull the membrane toward a poled permalloy region 215 (N–S poles indicated by arrow 257, magnetic flux lines indicated by lines 256) at a position 254, opening the valve and allowing pressurized air in the chamber 203 to escape through outlet conduit 226. When the current is reduced, the mechanically biased membrane 258 is left in one of its two mechanically stable positions, so it remains in that open position. To close the valve 250, voltage address lines can be transiently electrically addressed to reverse current direction, resulting in sufficient electromagnetic force to push the magnetically poled membrane to its original blocking position, closing the valve and preventing pressurized air in the chamber 203 from escaping through outlet conduit 226. As compared to the foregoing magnetically poled embodiment in FIG. 11, valve 250 has faster operation due to the lower inductance and lower mass of the planar coil relative the transiently created permalloy magnetic circuit.

Figure 13:
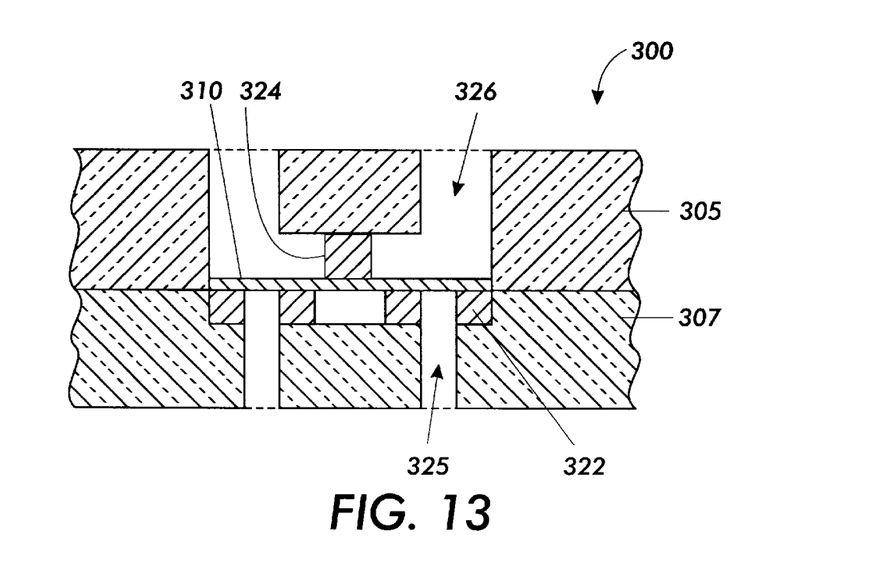
FIG. 13 is a side view of a flap valve.

In addition to electromagnetic valves, other valve structures can of course be used in the present invention. For example, FIG. 13 illustrates a simple electrostatic flap valve 300 formed using a bonded dual laminate substrate 305 that can be batch constructed by appropriate modification of conventional printed circuit board construction techniques. As can be seen in FIG. 13, the valve 300 is formed by laminating a first board 305 to a second board 307. The board 305 has a drilled out air outlet conduit 326 and supports an anchor 324 and flap 310, both generally formed from etched copper or other conductor, optionally coated with an insulative layer such as parylene. The second board 307 has surrounding electrodes 322 that are actively addressable by row and address lines (not shown) to apply a predetermined threshold voltage sufficient to hold the flap 310 closed against air pressure applied through drilled out air inlet conduit 325. Since the flap valve is normally open under applied air pressure, to open the valve 300 merely requires one of the addressing lines to reduce applied voltage to the electrodes 322, allowing the flap 310 to move away from the surround electrodes and causing pressurized air to jet through outlet conduit 226. As will be appreciated, various modifications of this valve scheme are contemplated, including but not limited to rearranging the flap to maintain a normally closed, rather than normally open position.

Figure 14:
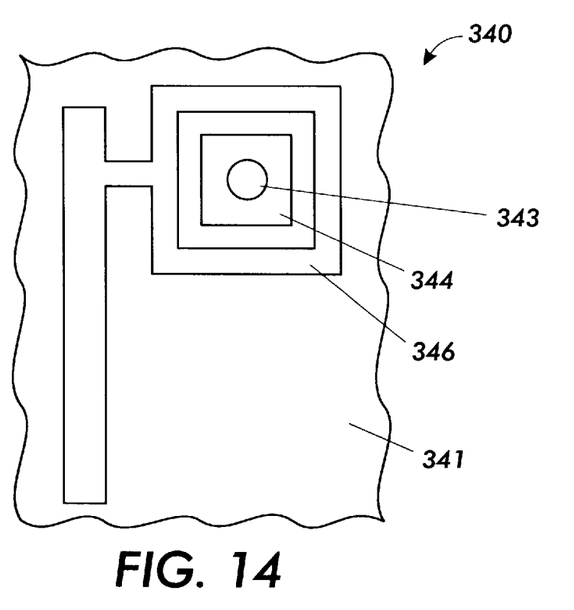
FIG. 14 is a top view of an alternative flap valve, showing addressing lines.
Figure 15:
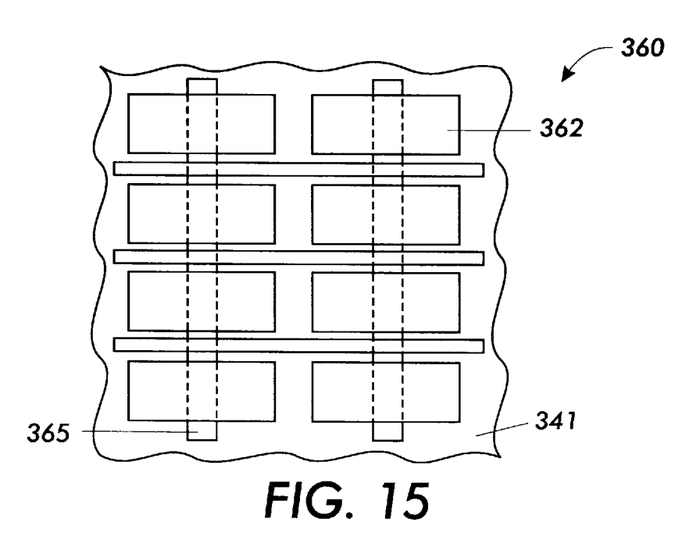
FIG. 15 is a top view of a flap valve array.

As will be appreciated, diverse valve structures are enabled by appropriate use of printed circuit board/microelectromechanical construction techniques. As yet another example, FIGS. 14 and 15 respectively illustrate passively addressable electrostatic flap valves 340 and flap valve arrays 360 that can be constructed by soldering, gluing, using photo-patternable glues or laminates, electroforming fabrication techniques (in the case of the flap valve illustrated in FIG. 15) or any other conventional attachment techniques to form a mechanically bistable flap 342 (or flaps 362 with flap anchors 365 in FIG. 15) embeddable in a laminate 341. In FIG. 14, the flap 342 covers a drilled out hole 343, and can be moved between an open and closed position only when both electrodes 344 and 346 are addressed, with voltage addressing of a single electrode being insufficient to move the flap 342. If additional bistability for either flap designs illustrated in FIGS. 14 or 15 is needed, provision of additional latch or "catch" electrodes that permit maintenance of a small constant voltage to hold a flap in position until application of much great switching voltage is also contemplated.

While the present invention has been described in conjunction with specific embodiments thereof, it is evident that many alternatives, modifications, and variations will be apparent to those skilled in the art. Accordingly, the various embodiments described herein should be considered illustrative, and not limiting the scope of the present invention as defined in the following claims.

What is claimed is:

1. A fluid flow transport system for moving a flexible object, the system comprising a fluid pressure source a conveyor having at least one laminate composed of a dielectric base material impregnated with a resin, the conveyor being positioned in fluid contact with the fluid pressure source, an array of microactuators at least partially embedded in the laminate of the conveyor, with each microactuator having a component movable with respect to the dielectric base material to control fluid flow from the fluid pressure source, and a plurality of metallic electrical connections photolithographically formed on the laminate and electrically connected to the microactuators.

2. The transport system of claim 1, wherein each microactuator is incorporated in each of a plurality of independently operated air jets for selectively directing air flows to impart momentum to the flexible object.

3. The transport system of claim 1, further comprising a plurality of laminates bonded together to form multiple layers, and wherein at least some of the microactuators in the array of microactuators are embedded within those multiple layers.

4. A transport system for moving a flexible object, the system comprising a fluid pressure source, a conveyor having at least one laminate substantially composed of a dielectric base material impregnated with resin, the conveyor being positioned in fluid contact with the fluid pressure source, an array of sensors at least partially embedded in the laminate to track position of the flexible object, and a plurality of metallic electrical connections photolithographically formed on the laminate and electrically connected to microactuators electrically connected to the array of sensors and positioned in contact with the conveyor to control fluid flow from the fluid pressure source.

\* \* \* \* \*

UNITED STATES PATENT AND TRADEMARK OFFICE
CERTIFICATE OF CORRECTION

| | |
|---|---|
| PATENT NO. | : 5,839,722 |
| APPLICATION NO. | : 08/756153 |
| DATED | : November 24, 1998 |
| INVENTOR(S) | : Andrew A Berlin et al. |

It is certified that error appears in the above-identified patent and that said Letters Patent is hereby corrected as shown below:

Column 1, line 3, insert as a new paragraph:

This invention was made with Government support under DABT63-95-C-0025 awarded by ARPA. The Government has certain rights in this invention.

Signed and Sealed this

Eighteenth Day of March, 2008

JON W. DUDAS
*Director of the United States Patent and Trademark Office*